United States Patent [19]

Assal

[11] Patent Number: 4,984,705
[45] Date of Patent: Jan. 15, 1991

[54] MOUNTING FIXTURE FOR ELECTRICAL JUNCTION BOXES

[75] Inventor: Jerome V. Assal, Glenside, Pa.
[73] Assignee: AMP Incorporated, Harrisburg, Pa.
[21] Appl. No.: 518,636
[22] Filed: May 3, 1990
[51] Int. Cl.⁵ .............................................. H02G 3/08
[52] U.S. Cl. ..................................... 220/3.9; 220/3.2
[58] Field of Search ............................ 220/3.2, 3.9; 248/DIG. 6

[56] References Cited

U.S. PATENT DOCUMENTS

| | | | |
|---|---|---|---|
| 2,023,083 | 12/1935 | Knell | 220/3.9 |
| 2,644,600 | 7/1953 | Senif | 220/3.9 |
| 3,299,199 | 1/1967 | Mattingly | 220/3.9 X |
| 3,365,156 | 1/1968 | Beck | 220/3.9 X |
| 4,062,470 | 12/1977 | Boteler | 220/3.9 X |
| 4,747,506 | 5/1988 | Stuchlik, III | 220/3.9 |

*Primary Examiner*—Steven M. Pollard
*Attorney, Agent, or Firm*—Allan B. Osborne

[57] ABSTRACT

A mounting fixture (24) for use with electrical junction boxes (10) has been disclosed. The fixture (24) includes a pair of L-shaped strips (26) which are mounted on a surface of the junction box (10) to define a space (32) therebetween for receiving a mounting insert (38) and retaining the insert (38) by being positioned beneath the second legs (30) of the strips (26).

1 Claim, 2 Drawing Sheets

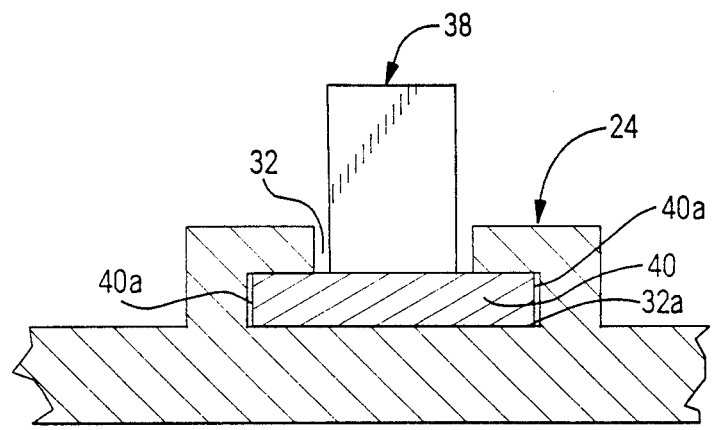
Figure 5
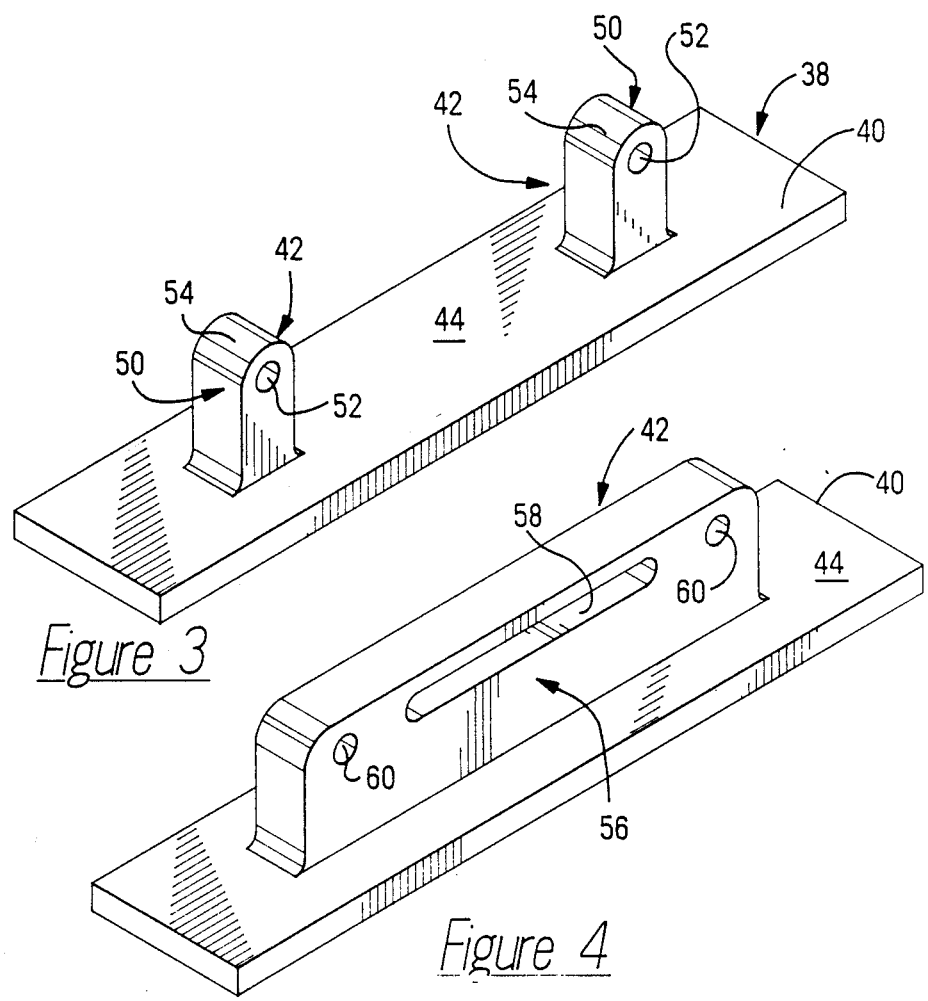
Figure 3
Figure 4

MOUNTING FIXTURE FOR ELECTRICAL JUNCTION BOXES

FIELD OF THE INVENTION

The invention disclosed herein relates to mounting fixtures on electrical junction boxes for mounting the boxes in the raceways of modular wall panels or in modular office furniture.

BACKGROUND OF THE INVENTION

A substantial number of manufacturers making modular wall panels have each developed designs therefore which reflect what each feel will meet the utilitarian and aesthetic features required by the end users. Such diversity is also reflected in the way electrical junction boxes are mounted in the wire raceways. Accordingly, a need exists for a mounting fixture which will permit installers of electrical components in raceways to select one of several mounting inserts for use with a single type of electrical junction box.

SUMMARY OF THE INVENTION

According to the invention, a mounting fixture is provided for use on an electrical junction box. The mounting fixture includes a pair of spaced apart L-shaped strips attached to a surface of the box. A first leg is normal to the surface and the second leg is parallel to and spaced from the surface and further extends towards the second leg on the other strip. The space defined between the strips receives and retains an insert having an attachment device thereon.

BRIEF DESCRIPTION OF THE DRAWINGS

FIGS. 3 and 4 are perspective views of other mounting inserts; and

FIG. 5 is an end section view taken along lines 5—5 in FIG. 2.

DESCRIPTION OF THE INVENTION

Figure 1:
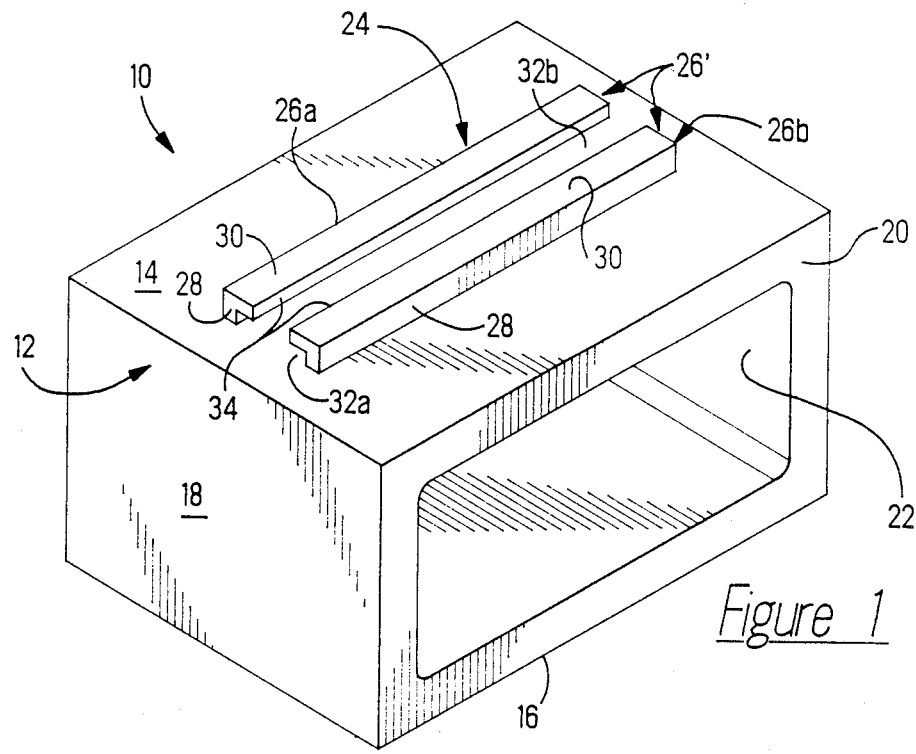
FIG. 1 is a perspective view of an electrical junction box with a mounting fixture of the present invention thereon.

As shown in FIG. 1, junction box 10 (shown diagrammatically) includes dielectric housing 12 having top and bottom surfaces 14, 16 respectively and end surfaces 18. Side surfaces 20 include openings 22 for receiving duplex receptacles (not shown).

Mounting fixture 24 is provided on top surface 14 and, if desired, also on bottom surface 16 (not shown). Fixture 24 consists of two L-shaped strips 26a, 26b (collectively 26) with each having a short or first leg 28 and a long or second leg 30.

Preferably strips 26 are molded as part of housing 12 although they may be made separately and added on. Short legs 28 are normal to surface 14 and legs 30 are parallel to and spaced from surface 14 to define space 32a therebetween. Free ends 34 of legs 30 face each other and define space 32b therebetween. Although the drawing shows strips 26 as being inwardly from the edges, they may be located at or closer to the edges.

Figure 2:
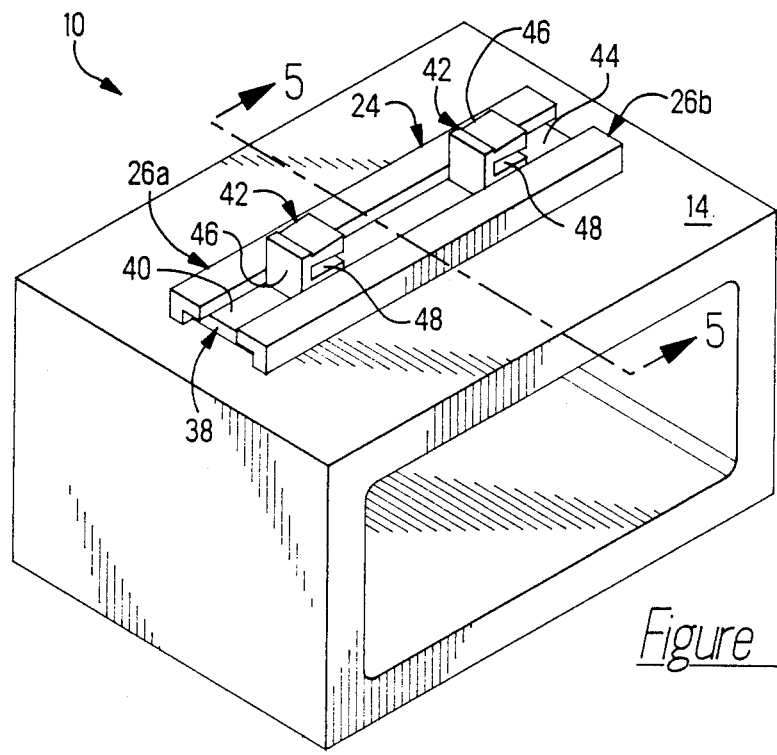
FIG. 2 is a perspective view of the junction box with a mounting insert in the mounting fixture.

Mounting inserts 38, as shown in FIGS. 2, 3 and 4 include plate 40 and an attachment device 42 located on surface 44 of plate 40. Devices 42 are used to attach junction box 10 to a mounting member (not shown) located in a wiring raceway (not shown) and may be of any particular design as required. Three different designs are shown in FIGS. 2, 3 and 4. Device 42 as shown in FIG. 2 includes upstanding pillars 46 having slots 48 to allow box 10 to be slid onto cross braces (not shown). Device 42 in FIG. 3 includes posts 50 having openings 52 adjacent free ends 54 for receiving rods (not shown) therethrough. Device 42 shown in FIG. 4 includes an elongated blade 56 having a slot 58 between openings 60 to receive either rods (not shown) or a wide brace (not shown).

FIGS. 2 and 5 show an insert 38 positioned in fixture 24. Assembly requires sliding plate 40 into groove 32 (a combination of spaces 32a and 32b) from either end with the sides 40a of plate 40 being received in space 32a so that junction box 10 may be suspended from a mounting member (not shown). It is obvious that the installer needs only to select an insert 38 having the proper attachment device 42 and slide it into fixture 24 to enable him to secure box 10 in the raceway (not shown).

An important advantage of the present invention is that it provides commonality of connector technology for use with all types of modular wall panels and office furniture with the only variable being the attachment means.

As can be discerned, an electrical junction box having a mounting fixture for receiving one of several inserts having a given attachment device thereon has been disclosed. The mounting fixture includes a pair of spaced apart L-shaped strips which provide a groove to receive the insert from either end. The attachment device on the insert permits the junction box to be suspended from a mounting member in a wiring raceway.

I claim:

1. A mounting fixture and mounting inserts for use on an electrical junction box, comprising:

a mounting fixture comprising a pair of spaced apart, L-shaped strips on one surface of an electrical junction box with a first leg being normal to and extending away from said one surface and a second leg being parallel to and spaced from said one surface and having a free end facing a free end on the other second leg, said strips defining in cooperation with each other a space therebetween; and a mounting insert having a plate slidably received is said space between said L-shaped strips and retained therein by said second legs and an attachment device on said plate and extending outwardly to attachment means in an electrical raceway, said device comprising a pair of spaced apart pillars with each having a slot opening out in the same direction and parallel to said plate.

* * * * *